US006729430B2

(12) United States Patent
Adams et al.

(10) Patent No.: US 6,729,430 B2
(45) Date of Patent: May 4, 2004

(54) ENGINE MOTION RESTRICTOR FOR VEHICLE, AND VEHICLE INCLUDING SUCH AN ENGINE MOTION RESTRICTOR

(75) Inventors: Blake Adams, Cedar Springs, MI (US); Peter Howorth, Fairview, PA (US)

(73) Assignee: Paulstra CRC, Grand Rapids, MI (US)

( * ) Notice: Subject to any disclaimer, the term of this patent is extended or adjusted under 35 U.S.C. 154(b) by 161 days.

(21) Appl. No.: 09/969,224

(22) Filed: Oct. 2, 2001

(65) Prior Publication Data

US 2003/0062213 A1 Apr. 3, 2003

(51) Int. Cl.$^7$ ................................................ B60K 8/00
(52) U.S. Cl. ...................... 180/300; 180/297; 267/141.1
(58) Field of Search ................................. 180/300, 291, 180/297, 299, 298, 312, 311, 381, 382, 313, 89.17; 267/141.1, 140, 139, 70, 71, 72, 201; 188/371; 248/610, 638

(56) References Cited

U.S. PATENT DOCUMENTS

| | | | | |
|---|---|---|---|---|
| 2,094,304 A | * | 9/1937 | Salenius | 188/306 |
| 3,402,782 A | * | 9/1968 | Ljungstrom | 180/300 |
| 3,825,090 A | * | 7/1974 | Runkle et al. | 180/292 |
| 4,518,058 A | * | 5/1985 | Fister et al. | 180/300 |
| 4,641,810 A | * | 2/1987 | Ott | 248/635 |
| 4,706,946 A | * | 11/1987 | Thorn et al. | 267/292 |
| 4,779,834 A | * | 10/1988 | Bittner | 180/300 |
| 4,901,814 A | * | 2/1990 | von Broock et al. | 180/297 |
| 5,037,058 A | * | 8/1991 | Kojima et al. | 180/300 |
| 5,174,552 A | * | 12/1992 | Hodgson et al. | 267/140.11 |
| 5,205,374 A | * | 4/1993 | Love et al. | 180/300 |
| 5,310,017 A | * | 5/1994 | Tobias | 180/291 |
| 5,364,061 A | | 11/1994 | Ciolczyk et al. | |
| 5,554,059 A | * | 9/1996 | Yamasaki | 180/300 |
| 5,701,969 A | * | 12/1997 | Stephens | 180/300 |
| 5,934,423 A | * | 8/1999 | Kallenbach | 248/610 |

FOREIGN PATENT DOCUMENTS

| FR | 1 562 598 | 3/1980 |
|---|---|---|
| FR | 2 604 231 | 3/1988 |

OTHER PUBLICATIONS

International search report; EPO 02 29 2302 dated Jan. 7, 2003.

* cited by examiner

Primary Examiner—Brian L. Johnson
Assistant Examiner—Hau Phan
(74) Attorney, Agent, or Firm—Marshall, Gerstain & Borun LLP

(57) ABSTRACT

An engine motion restrictor for limiting movements of a vehicle engine relative to a vehicle structure, the engine motion restrictor including a first strength member connected to an intermediate member through an elastomer mount, and a flexible cable which connects the intermediate member to a second strength member.

14 Claims, 2 Drawing Sheets

ENGINE MOTION RESTRICTOR FOR VEHICLE, AND VEHICLE INCLUDING SUCH AN ENGINE MOTION RESTRICTOR

FIELD OF THE INVENTION

The present invention relates to engine motion restrictors for vehicles, and to vehicles including such engine motion restrictors.

More particularly, the invention relates to an engine motion restrictor for limiting movements of a vehicle engine relative to a vehicle structure (vehicle frame and/or vehicle body) on which said engine is mounted, said engine motion restrictor including:

- first and second rigid strength members, one of said strength members being designed to be fixed to the engine and the other strength member being designed to be fixed to the vehicle structure,
- a mechanical link member connecting said first strength member to said second strength member,
- and at least an elastomer mount interposed between said first strength member and the link member (optionally, an additional elastomer mount could be interposed between the second strength member and the link member).

BACKGROUND OF THE INVENTION

In known engine motion restrictors, as disclosed for instance in U.S. Pat. No. 5,364,061, the two strength members are constituted by metal bushings which are respectively surrounded by two elastomer mounts, said elastomer mounts being connected to a rigid link rod constituting said link member.

These known engine restrictors are generally satisfactory, but may however experience the following drawbacks:

- their stiffness perpendicularly to the longitudinal direction of the link rod may generally not be cut down to very low values, at a reasonable cost,
- the link rod may experience resonance phenomena at certain speeds of the engine, which generates noises or other vibrations transmitted between the engine and the vehicle structure,
- and it is difficult to design the rigid link rod so that it may collapse under a collision event, as it is sometimes required by carmakers.

OBJECTS AND SUMMARY OF THE INVENTION

An object of the present invention is to overcome these drawbacks.

To this end, according to the invention, in an engine motion restrictor of the above type, the mechanical link includes an intermediate rigid member and a flexible cable which connects said intermediate member to said second strength member, said elastomer mount being interposed between said first strength member and said intermediate member.

This engine motion restrictor may be mounted so as to:

- be in tension when the engine generates a torque in normal driving condition, in which case the engine motion restrictor effectively restricts the rolling motion to which the engine is subjected,
- and enable free movement of the engine when the vehicle operates in reverse.

The design of the engine motion restrictor according to the invention enables to reduce forces transmitted from the engine to the vehicle structure in directions perpendicular to the direction of the cable. This eliminates some eigen modes of resonance experienced by common engine motion restrictor designs.

Further, the invention may allow for very low stiffness values at idle by incorporating slack in the cable under low torque produced by the engine, which then results in good vibration isolation.

Alternatively, some preload may be applied to the cable under idle, providing stiffness under some reverse loading conditions.

Besides, since the cable has negligible stiffness in compression, the engine motion restrictor may collapse in the event of a collision, thus improving energy absorption.

Additionally, the invention provides cost and weight benefits over conventional designs due to the possible use of only one molding, and elimination of a rigid link rod.

Further, only a small and versatile package space is required for the engine motion restrictor according to the invention.

In preferred embodiments of the engine motion restrictor according to the invention, one or several of the following additional features may possibly be used:

- the first strength member includes a housing having at least a bottom and two parallel side walls which extend substantially parallel to the cable from said bottom toward said cable, the intermediate member being situated at least partly between said side walls, and the elastomer mount including at least two elastomer arms which extend in mutually opposite directions, each between an inner end and an outer end, the inner end of each elastomer arm being fixed to the intermediate member and the outer end of each elastomer arm being fixed to one of the side walls of the housing;
- the two elastomer arms diverge slantwise from their inner ends toward their outer ends, the elastomer mount thus having a V shape which is open toward the cable;
- each side wall of the housing extends from said bottom to a free end which is extended toward the intermediate member by a rigid wing, the two rigid wings of the housing being designed to cooperate by abutment with the two elastomer arms to limit movements of the intermediate member away from the bottom of said housing;
- the intermediate member includes a plate having two faces substantially parallel to the side walls of the housing, each face of the plate being adhered to the inner end of one of the elastomer arms;
- the plate of the intermediate member includes two rigid tabs near the bottom of the housing, said tabs of the plate being folded substantially parallel to said bottom;
- a bolt is fixed to the bottom of the housing, said bolt extending outwardly from the housing;
- the intermediate member is fixed to the cable by crimping;
- the second strength member includes an eyelet and is fixed to the cable by crimping.

Besides, another object of the invention is a vehicle including an engine supported on a vehicle structure (vehicle frame and/or vehicle body), said engine being connected to the vehicle structure through at least an engine motion restrictor for limiting movements of said engine relative to said vehicle, said engine motion restrictor including:

- first and second rigid strength members, one of said strength members being fixed to the engine and the other strength member being fixed to the vehicle structure, a link member connecting said first strength member to said second strength member, and at least an elastomer mount interposed between said first strength member and the link member (optionally, an additional elastomer mount could be interposed between the second strength member and the link member), wherein the link member includes an intermediate rigid member and a flexible cable which connects said intermediate member to said second strength member, said elastomer mount being interposed between said first strength member and said intermediate member.

In preferred embodiments of the vehicle according to the invention, one or several of the following additional features may possibly be used:

the first strength member is fixed to the vehicle structure and the second strength member is fixed to the engine;

the engine motion restrictor is mounted so as to be in tension when the engine generates at least a predetermined torque (said predetermined torque may possibly be 0) in normal driving condition, and so as to enable free movement of the engine when the vehicle operates in reverse;

the cable is dimensioned to be slack when the engine operates under idle;

the cable is dimensioned to be in tension when the engine operates under idle.

BRIEF DESCRIPTION OF THE DRAWINGS

Other features and advantages of the invention will appear from the detailed description below of one of its embodiments, given as a non-limiting example, with regard to the appended drawings.

In the drawings.

MORE DETAILED DESCRIPTION

In the various figures, the same references designate identical or similar components.

Figure 1:
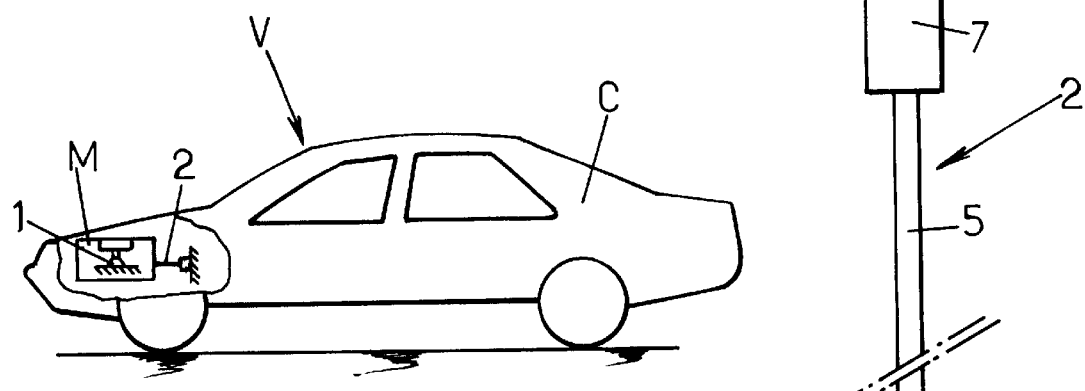
FIG. 1 is schematic drawing showing a vehicle fitted with an engine motion restrictor according to an embodiment if the invention.

FIG. 1 shows an automotive vehicle V including a vehicle structure C (vehicle frame and/or vehicle body) and a vehicle engine M mounted on the vehicle structure through several antivibratory mounts 1, for instance hydraulic antivibratory mounts, which are well-known in the art.

Further, in order to limit movements of the engine M relative to the vehicle structure C, in particular when the engine M produces a propulsive torque, said engine M is further connected to the structure C through at least one engine movement restrictor or roll restrictor 2.

Figure 2:
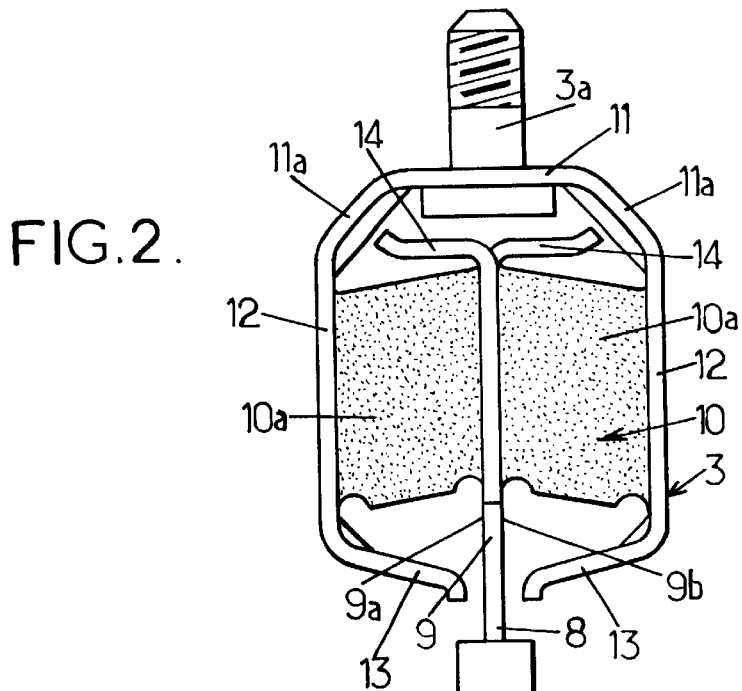
FIGS. 2 and 3 are respectively a side view and a perspective view of the engine motion restrictor of the vehicle of FIG. 1.
Figure 3:
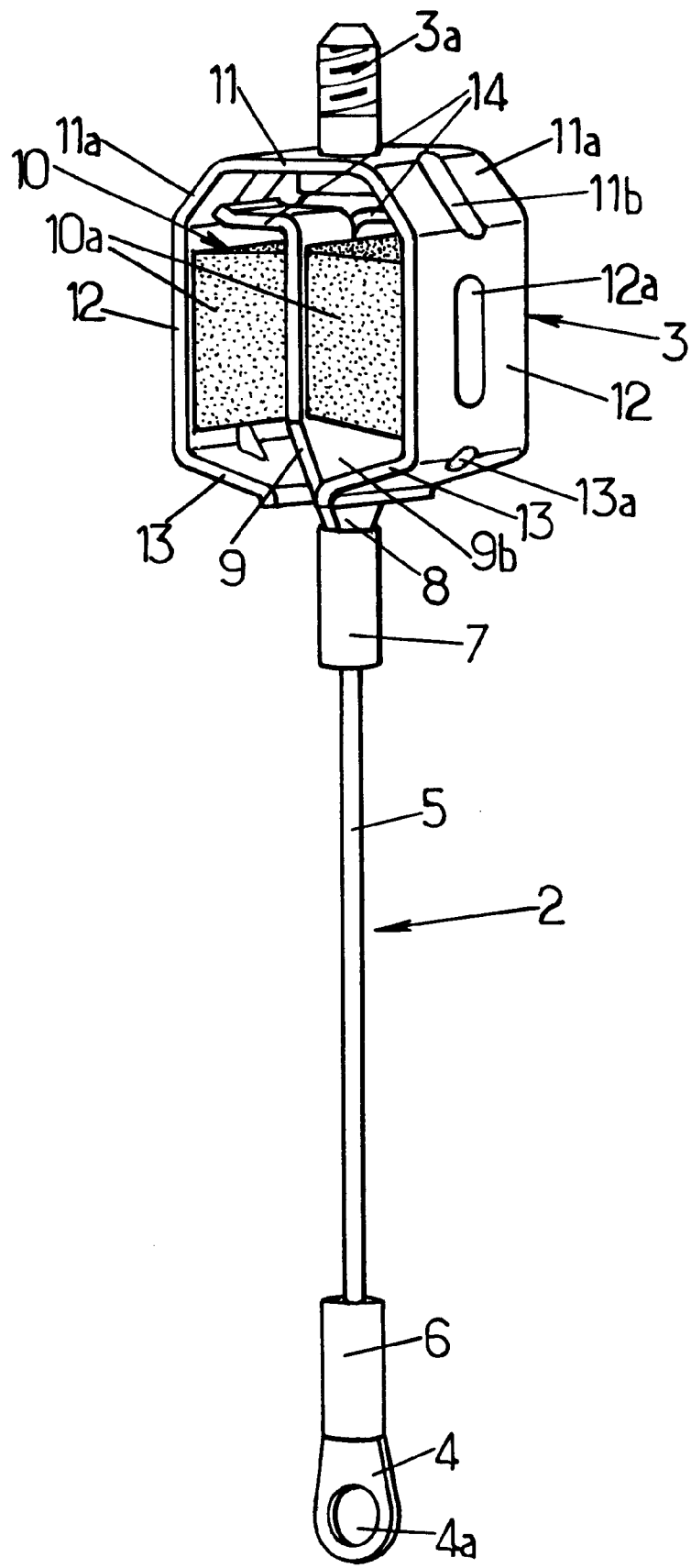

As shown in more details in FIGS. 2 and 3, the engine motor restrictor 2 includes two rigid strength members 3, 4 which may be for instance made out of steel, and which are designed to be fixed, one to the vehicle structure C and the other to the vehicle engine M.

These two strength members are connected together through a mechanical link which includes a flexible cable 5, for instance a cable made out of a strand of steel wires, said cable 5 exhibiting for instance an outer diameter comprised between three and ten millimeters.

One of the ends of cable 5 is fixed to strength member 4 through a crimping 6, said strength member 4 including for instance an eyelet 4a and being more particularly designed to be fixed to the vehicle engine through a screw or similar.

Besides, the other end of cable 5 is fixed to an intermediate rigid member 8 through an additional crimping 7.

The intermediate member 8 advantageously includes a flat plate 9 which extends away from cable 5 substantially parallel to said cable, said plate 9 including two faces 9a, 9b.

The intermediate member 8 is connected to strength member 3 through an elastomer mount 10 which here includes two arms 10a extending in mutually opposite directions substantially perpendicular to plate 9. Said arms 10a extending slightly slantwise toward cable 5, from inner ends which are adhered to the two faces 9a, 9b of plate 9 toward outer ends which are adhered to strength member 3, so that the elastomer mount 10 exhibits a slight V shape which is open toward cable 5.

Advantageously, strength member 3 is in the form of a housing made out of sheet steel, said housing including:

a bottom or web 11 which extends substantially perpendicular to cable 5 and which is fixed to a mount 3a designed to be fixed for instance to the vehicle structure C, said bottom 11 advantageously including two bent edges 11a which extend slantwise outwardly in opposite directions and toward cable 5, two side walls 12 which extend substantially parallel to plate 9 on both sides of said plate, each side wall 12 having an inner face which is adhered to the outer end of one of the arms 10a of elastomer mount 10, and said side wall 12 extending toward cable 5 from bottom 11 up to a free end, and two rigid bent wings 13 which extend inwardly and slightly slantwise toward cable 5 from the inner ends of the two side walls 12.

Advantageously, strength member 3 may be made more rigid by providing stampings 11b, 12a, 13a, said stampings preferably forming longitudinal ribs which extend in one or several planes including cable 5. Said stampings may be provided for instance in the two bent edges 11a of the bottom, in the two side walls 12 and at the junction between the side walls 12 and the bent wings 13.

Finally, plate 9 is split in two tabs 14 at its free end which is near the bottom 11, these rigid tabs 14 being folded substantially perpendicular to cable 5.

These tabs 14, as well as the wings 13, enable to limit the extension of the engine motion restrictor when it is under tension, thus protecting the elastomer mount 10.

As a matter of fact, when cable 5 is submitted to a high tension load, the two arms 10a of the elastomer mount come into abutment with the two bent wings 13, and the two tabs 14 come into abutment with the two arms 10a on the opposite side of the elastomer mount. Thus, the two arms 10a of the elastomer mount are then compressed between the tabs 14 and the wings 13, which efficiently limits the extension of the engine motion restrictor.

Advantageously, the engine motion restrictor 2 is mounted so as to be in tension when the engine operates in normal driving condition, and so as to enable free movement of the engine when the vehicle operates in reverse.

In a preferred embodiment, the cable is dimensioned to be slack when the engine operates under idle, and to be in tension only when the engine generates a sufficient torque in normal driving condition, which allows for very low stiffness values in the direction of cable 5 under idle.

Alternatively, a tension preload may be applied to the cable 5 under idle, which provides some stiffness in the direction of cable 5 under small torque in reverse operation on the vehicle.

Thanks to the use of cable 5, the engine motion restrictor 2 described above enables to reduce drastically forces transmitted from the engine to the vehicle structure in directions perpendicular to the cable, which eliminates some resonance phenomena generating noise in particular under idle in common engine motion restrictor designs. Further, in case of a collision, the engine motion restrictor 2 may collapse very easily due to the use of flexible cable 5, thus improving energy absorption and security.

We claim:

1. An engine motion restrictor for limiting movements of a vehicle engine relative to a vehicle structure on which said engine is mounted, said engine motion restrictor including:

first and second rigid strength members, one of said strength members being designed to be fixed to the engine and the other strength member being designed to be fixed to the vehicle structure, a mechanical link connecting said first strength member to said second strength member, and at least an elastomer mount interposed between said first strength member and the link member, wherein the mechanical link includes an intermediate rigid member and a flexible cable which connects said intermediate member to said second strength member, said elastomer mount being interposed between said first strength member and said intermediate member, the first strength member including a housing, and wherein said housing has a bottom and two side walls which extend from said bottom towards said cable, the intermediate member being situated at least partly between said side walls, and the elastomer mount including at least two elastomer arms which extend in mutually opposite directions, each between an inner end and an outer end, the inner end of each elastomer arm being fixed to the intermediate member and the outer end of each elastomer arm being fixed to one of the side walls of the housing.

2. An engine motion restrictor according to claim 1, wherein said side walls are substantially parallel to the cable and parallel to one another.

3. An engine motion restrictor according to claim 2, wherein the two elastomer arms diverge slantwise from their inner ends toward their outer ends, the elastomer mount thus having a V shape which is open toward the cable.

4. An engine motion restrictor according to claim 1, wherein each side wall of the housing extends from said bottom to a free end which is extended toward the intermediate member by a rigid wing, the two rigid wings of the housing being designed to cooperate by abutment with the two elastomer arms to limit movements of the intermediate member away from the bottom of said housing.

5. An engine motion restrictor according to claim 4, wherein the intermediate member includes a plate having two faces substantially parallel to the side walls of the housing, each face of the plate being adhered to the inner end of one of the elastomer arms.

6. An engine motion restrictor according to claim 5, wherein the plate of the intermediate member includes two rigid tabs near the bottom of the housing, said tabs of the plate being folded substantially parallel to said bottom.

7. An engine motion restrictor according to claim 1, wherein a bolt is fixed to the bottom of the housing, said bolt extending outwardly from the housing.

8. An engine motion restrictor according to claim 1, wherein the intermediate member is fixed to the cable by crimping.

9. An engine motion restrictor according to claim 1, wherein the second strength member includes an eyelet and is fixed to the cable by crimping.

10. A vehicle including an engine supported on a vehicle structure, said engine being connected to the vehicle structure through at least an engine motion restrictor for limiting movements of said engine relative to said vehicle, said engine motion restrictor including:

first and second rigid strength members, one of said strength members being fixed to the engine and the other strength member being fixed to the vehicle structure, a link member connecting said first strength member to said second strength member, and at least an elastomer mount interposed between said first strength member and the link member, wherein the link member includes an intermediate rigid member and a flexible cable which connects said intermediate member to said second strength member, said elastomer mount being interposed between said first strength member and said intermediate member, and wherein said housing has a bottom and two side walls which extend from said bottom towards said cable, the intermediate member being situated at least partly between said side walls, and the elastomer mount including at least two elastomer arms which extend in mutually opposite directions, each between an inner end and an outer end, the inner end of each elastomer arm being fixed to the intermediate member and the outer end of each elastomer arm being fixed to one of the side walls of the housing.

11. A vehicle according to claim 10, wherein the first strength member is fixed to the vehicle structure and the second strength member is fixed to the engine.

12. A vehicle according to claim 10, wherein the engine motion restrictor is mounted so as to be in tension when the engine generates at least a predetermined torque in normal driving condition, and so as to enable free movement of the engine when the vehicle operates in reverse.

13. A vehicle according to claim 12, wherein the cable is dimensioned to be slack when the engine operates under idle.

14. A vehicle according to claim 12, wherein the cable is dimensioned to be in tension when the engine operates under idle.

* * * * *